United States Patent
Oliveira et al.

(10) Patent No.: US 11,577,494 B2
(45) Date of Patent: Feb. 14, 2023

(54) MULTILAYER STRETCH FILMS AND METHODS THEREOF

(71) Applicants: Dow Global Technologies LLC, Midland, MI (US); PBBPolisur S.R.L., Buenos Aires (AR); Dow Quimica De Colombia S.A., Bogota (CO)

(72) Inventors: Marlos Giuntini De Oliveira, Sao Paulo (BR); Teresa P. Karjala, Lake Jackson, TX (US); Mustafa Bilgen, Manvel, TX (US); Jorge Caminero Gomes, Sao Paulo (BR); Maximiliano Zanetti, Buenos Aires (AR); Miguel A. Molano Niampira, Bogota (CO); Jorge Mario Rodriguez Camelo, Bogota (CO); Camila Do Valle, Sao Paulo (BR); Guillermo A. Raimondi, Buenos Aires (AR)

(73) Assignees: Dow Global Technologies LLC, Midland, MI (US); DOW QUIMICA DE COLOMBIA SA, Bogota (CO); PBBPOLISUR SRL, Buenos Aires (AR)

( * ) Notice: Subject to any disclaimer, the term of this patent is extended or adjusted under 35 U.S.C. 154(b) by 941 days.

(21) Appl. No.: 16/332,037

(22) PCT Filed: Sep. 11, 2017

(86) PCT No.: PCT/US2017/050892
§ 371 (c)(1),
(2) Date: Mar. 11, 2019

(87) PCT Pub. No.: WO2018/063782
PCT Pub. Date: Apr. 5, 2018

(65) Prior Publication Data
US 2022/0097348 A1    Mar. 31, 2022

Related U.S. Application Data

(60) Provisional application No. 62/471,077, filed on Mar. 14, 2017, provisional application No. 62/401,396, filed on Sep. 29, 2016.

(51) Int. Cl.
| | | |
|---|---|---|
| B32B 27/08 | (2006.01) | |
| C08J 5/18 | (2006.01) | |
| B32B 7/02 | (2019.01) | |
| B32B 27/32 | (2006.01) | |

(52) U.S. Cl.
CPC ............... *B32B 27/08* (2013.01); *B32B 7/02* (2013.01); *B32B 27/32* (2013.01); *C08J 5/18* (2013.01); *B32B 2250/03* (2013.01); *B32B 2250/242* (2013.01); *B32B 2270/00* (2013.01); *B32B 2274/00* (2013.01); *B32B 2307/10* (2013.01); *B32B 2307/54* (2013.01); *B32B 2307/581* (2013.01); *B32B 2307/5825* (2013.01); *B32B 2307/704* (2013.01); *B32B 2307/722* (2013.01); *B32B 2307/732* (2013.01); *B32B 2307/748* (2013.01); *B32B 2439/70* (2013.01)

(58) Field of Classification Search
CPC .......... B32B 7/00–7/14; B32B 27/32–27/327; C08F 4/00–4/82; C08F 10/00–10/14
See application file for complete search history.

(56) References Cited

U.S. PATENT DOCUMENTS

| | | |
|---|---|---|
| 9,255,160 B2 | 2/2016 | Desjardins et al. |
| 2006/0159943 A1 | 7/2006 | Brant et al. |
| 2010/0269455 A1 | 10/2010 | Parkinson et al. |
| 2014/0080970 A1* | 3/2014 | Desjardins ............ C08F 110/02 526/116 |
| 2014/0248480 A1 | 9/2014 | Vinck et al. |
| 2016/0108150 A1 | 4/2016 | Desjardins et al. |
| 2016/0221312 A1 | 8/2016 | German |
| 2016/0271916 A1 | 9/2016 | Ma et al. |

FOREIGN PATENT DOCUMENTS

| | | | |
|---|---|---|---|
| WO | 2011129956 | 10/2011 | |
| WO | 2012044291 A1 | 4/2012 | |
| WO | WO-2013081742 A1 * | 6/2013 | ............ B32B 27/08 |
| WO | 2015119845 | 8/2015 | |
| WO | 2015120401 | 8/2015 | |

OTHER PUBLICATIONS

"Exceed 1018CA Metallocene Polyethylene Resin". ExxonMobil Chemical, (2009); pp. 1-2.*
PCT/US2017/050892, International Search Report and Written Opinion dated Dec. 15, 2017.
PCT/US2017/050892, International Preliminary Report on Patentability dated Apr. 2, 2019.

* cited by examiner

*Primary Examiner* — Prashant J Khatri

(57) ABSTRACT

Embodiments disclosed herein include multilayer films having a cling layer, a core layer, and a release layer, wherein the cling layer comprises a propylene interpolymer and the core layer comprises a core layer polyethylene composition.

10 Claims, No Drawings

MULTILAYER STRETCH FILMS AND METHODS THEREOF

TECHNICAL FIELD

Embodiments of the present disclosure generally relate to multilayer stretch films, and more particularly, to multilayer stretch films having a high cling force.

BACKGROUND

Multilayer films are often used in packaging, and may package diverse items, such as, bulk farm materials like grass and hay to small grocery store items like meats and vegetables. For all of these items it is usually desirable to have a strong, stretchy film that has a sufficient level of tack or cling such that the film can releasably adhere to itself and/or an article that is wrapped with the film.

Cling is one of the key performance requirements in stretch films. To achieve the desired level of cling, additives may be incorporated into a cling layer to improve the tack of the cling layer. However, films that include such additives can have a higher cost compared to the base resins and may have a significant impact on the overall cost of the stretch film. In addition, films that include such additives can have one or more drawbacks such as 1) being excessively noisy when unwound from a film-roll when utilized on a high speed wrapping machine, 2) having to be aged for a period of time so that the additive migrates to the surface of the film (i.e., blooms) during the aging period, 3) contaminating process equipment, and 4) causing two-sided cling when one-sided cling is desired. In addition, such additives can cause undue handling issues when they are in liquid form and drip to an undue degree from process equipment.

The multilayer films may also incorporate high levels of ethylene/alpha-olefin elastomers to achieve a higher level of tack or cling; however, ethylene/alpha-olefin elastomers can make the multilayer films very expensive.

Accordingly, alternative multilayer films may be desired having improved properties, such as, high cling, while also being cost-effective and/or relatively easy to fabricate using cast film techniques.

SUMMARY

Disclosed in embodiments herein are multilayer cast films. The multilayer cast films have a cling layer, a core layer, and a release layer, wherein: the cling layer comprises a propylene interpolymer comprising at least 60 wt. % units derived from propylene and between 1 and 40 wt. % units derived from ethylene, wherein the propylene interpolymer has a density of from 0.840 g/cm$^3$ to 0.900 g/cm$^3$, a highest DSC melting peak temperature of from 50.0° C. to 120.0° C., a melt flow rate, MFR2, of from 1 to 100 g/10 min when measured according to ASTM D1238 at 230° C. and 2.16 kg load, and a molecular weight distribution (MWD) of less than 4.0; and the core layer comprises a core layer polyethylene composition which comprises the reaction product of ethylene and, optionally, one or more alpha olefin comonomers, wherein the core layer polyethylene composition is characterized by one or more of the following properties: (a) a melt index, I2, of from 2.5 to 12.0 g/10 min; (b) a density of from 0.910 to 0.925 g/cc; (c) a melt flow ratio, I10/I2, of from 6.0 to 7.6; and (d) a molecular weight distribution, (Mw/Mn) of from 2.25 to 4.0.

Also disclosed in embodiments herein are methods of making multilayer cast films. The methods comprise coextruding a cling layer composition, a core layer composition, and a release layer composition to form a multilayer cast film; wherein the cling layer composition comprises a propylene interpolymer comprising at least 60 wt. % units derived from propylene and between 1 and 40 wt. % units derived from ethylene, wherein the propylene interpolymer has a density of from 0.840 g/cm$^3$ to 0.900 g/cm$^3$, a highest DSC melting peak temperature of from 50.0° C. to 120.0° C., a melt flow rate, MFR2, of from 1 to 100 g/10 min when measured according to ASTM D1238 at 230° C. and 2.16 kg load, and a molecular weight distribution (MWD) of less than 4.0; wherein the core layer composition comprises a core layer polyethylene composition which comprises the reaction product of ethylene and, optionally, one or more alpha olefin comonomers, wherein the core layer polyethylene composition is characterized by one or more of the following properties: (a) a melt index, I2, of from 2.5 to 12.0 g/10 min; (b) a density of from 0.910 to 0.925 g/cc; (c) a melt flow ratio, I10/I2, of from 6.0 to 7.6; and (d) a molecular weight distribution, (Mw/Mn) of from 2.25 to 4.0; and wherein the release layer composition comprises a linear low density polyethylene or a release layer polyethylene composition which comprises the reaction product of ethylene and, optionally, one or more alpha olefin comonomers, wherein the release layer polyethylene composition is characterized by one or more of the following properties: (a) a melt index, I2, of from 2.5 to 12.0 g/10 min; (b) a density of from 0.910 to 0.925 g/cc; (c) a melt flow ratio, I10/I2, of from 6.0 to 7.6; and (d) a molecular weight distribution, (Mw/Mn) of from 2.25 to 4.0.

Additional features and advantages of the embodiments will be set forth in the detailed description which follows, and in part will be readily apparent to those skilled in the art from that description or recognized by practicing the embodiments described herein, including the detailed description which follows the claims. It is to be understood that both the foregoing and the following description describe various embodiments and are intended to provide an overview or framework for understanding the nature and character of the claimed subject matter. The description serves to explain the principles and operations of the claimed subject matter.

DETAILED DESCRIPTION

Reference will now be made in detail to embodiments of multilayer cast films and materials used to make such films. "Multilayer cast film" and "multilayer film" may be used herein interchangeably to reference the multilayer cast films described herein. The multilayer cast films may be used in stretch-cling applications. It is noted, however, that this is merely an illustrative implementation of the embodiments disclosed herein. The embodiments are applicable to other technologies that are susceptible to similar problems as those discussed above. For example, the multilayer cast films described herein may be used as surface protection films, agricultural films, such as silage wrap, or in other flexible packaging applications, such as, shrink films, heavy duty shipping sacks, liners, sacks, stand-up pouches, detergent pouches, sachets, etc., all of which are within the purview of the present embodiments.

In embodiments described herein, the multilayer cast films comprise a cling layer, a core layer, and a release layer. Optionally, one or more intermediate layers may be positioned between the cling layer and the core layer and/or the core layer and the release layer. The cling layer is an outer layer of the multilayer cast film that has a sufficient level of adhesive tack such that the cling layer of the multilayer cast film may form a releasable bond when brought into contact with a surface, such as, the surface of an article or the surface of the release layer. The release layer is an outer layer of the multilayer cast film that exhibits low adhesion to the cling layer. The release layer can allow for separation to occur between the cling layer/release layer interface on a roll such that the multilayer cast film may be unrolled from a spool without undue force and/or without the film tearing.

The thickness of the cling, core, and release layers can vary over a wide range. In some embodiments, the cling layer may have a thickness that is from 5-50 percent of the overall thickness of the film, from 5-30 percent of the overall thickness of the film, or even from 5-20 percent of the overall thickness of the film. The core layer may have a thickness that is from 20-90 percent of the overall thickness of the film, 30-90 percent of the overall thickness of the film, 50-90 percent of the overall thickness of the film, or 60-90 percent of the overall thickness of the film. The release layer may have a thickness that is from 5-50 percent of the overall thickness of the film, from 5-30 percent of the overall thickness of the film, or even from 5-20 percent of the overall thickness of the film. The ratio of the thicknesses among a cling layer, a release layer, and the core layer can be any ratio that provides desirable properties such as cling, release, and the like. In some embodiments, a multilayer cast film can have a cling layer thickness, a core layer thickness, and a release layer thickness in a ratio in the range of 1:8:1 to 3:4:3.

Cling Layer

The cling layer may comprise a propylene interpolymer. As used herein, "polymer" means a polymeric compound prepared by polymerizing monomers, whether of the same or a different type. The generic term "polymer" embraces the terms "homopolymer," "copolymer," "terpolymer" as well as "interpolymer." "Interpolymer" refers to a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

Propylene interpolymer generally refers to polymers comprising propylene and an α-olefin having 2 carbon atoms or 4 or more carbon atoms. In embodiments herein, the propylene interpolymer comprises at least 60 wt. % of the units derived from propylene and between 1 and 40 wt. % of the units derived from ethylene (based on the total amount of polymerizable monomers). All individual values and subranges of at least 60 wt. % of the units derived from propylene between 1 and 40 wt. % of the units derived from ethylene are included and disclosed herein. For example, in some embodiments, the propylene interpolymer comprises (a) at least 65 wt. %, at least 70 wt. %, at least 75 wt. %, at least 80 wt. %, at least 82 wt. %, at least 85 wt. %, at least 87 wt. %, at least 90 wt. %, at least 92 wt. %, at least 95 wt. %, at least 97 wt. %, from 60 to 99 wt. %, from 60 to 99 wt. %, from 65 to 99 wt. %, from 70 to 99 wt. %, from 75 to 99 wt. %, from 80 to 99 wt. %, from 82 to 99 wt. %, from 84 to 99 wt. %, from 85 to 99 wt. %, from 88 to 99 wt. %, from 80 to 97 wt. %, from 82 to 97 wt. %, from 85 to 97 wt. %, from 88 to 97 wt. %, from 80 to 95.5 wt. %, from 82 to 95.5 wt. %, from 84 to 95.5 wt. %, 85 to 95.5 wt. %, or from 88 to 95.5 wt. %, of the units derived from propylene; and (b) between 1 and 40 wt. %, for example, from 1 to 35%, from 1 and 30%, from 1 and 25%, from 1 to 20%, from 1 to 18%, from 1 to 16%, 1 to 15%, 1 to 12%, 3 to 20%, 3 to 18%, 3 to 16%, 3 to 15%, 3 to 12%, 4.5 to 20%, 4.5 to 18%, 4.5 to 16%, 4.5 to 15%, or 4.5 to 12%, by weight, of units derived from ethylene. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

The propylene interpolymers can be made by any process, and include random, block and graft copolymers. In some embodiments, the propylene interpolymers are of a random configuration. These include interpolymers made by Ziegler-Natta, CGC (Constrained Geometry Catalyst), metallocene, and non-metallocene, metal-centered, heteroaryl ligand catalysis. Additional suitable metal complexes include compounds corresponding to the formula:

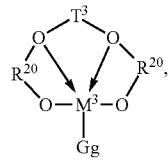

where:

$R^{20}$ is an aromatic or inertly substituted aromatic group containing from 5 to 20 atoms not counting hydrogen, or a polyvalent derivative thereof;

$T^3$ is a hydrocarbylene or silane group having from 1 to 20 atoms not counting hydrogen, or an inertly substituted derivative thereof;

$M^3$ is a Group 4 metal, preferably zirconium or hafnium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and covalent bonds and electron donative interactions are represented by lines and arrows respectively.

In some embodiments, such complexes correspond to the formula:

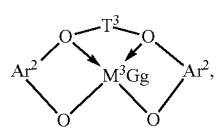

wherein:

$T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl- or aryl-substituted arylene group of from 6 to 20 atoms not counting hydrogen;

$M^3$ is a Group 4 metal, preferably hafnium or zirconium;

G independently each occurrence is an anionic, neutral or dianionic ligand group;

g is a number from 1 to 5 indicating the number of such X groups; and electron donative interactions are represented by arrows.

Examples of metal complexes of the foregoing formula include the following compounds:

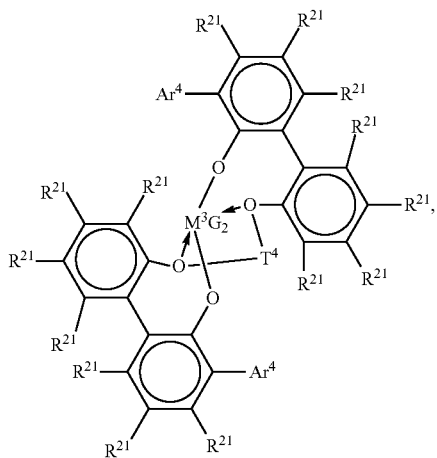

where $M^3$ is Hf or Zr;

$Ar^4$ is $C_{6-20}$ aryl or inertly substituted derivatives thereof, especially 3,5-di(isopropyl)phenyl, carbazole, 3,5-di(isobutyl)phenyl, dibenzo-1H-pyrrole-1-yl, or anthracen-5-yl, and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Without limiting in any way the scope of the invention, one means for making a propylene interpolymer as described herein is as follows: in a stirred-tank reactor, the monomers to be polymerized are introduced continuously together with any solvent or diluent, and, in some embodiments, the solvent is an alkane hydrocarbon solvent, such as, ISOPAR™ E. The reactor contains a liquid phase composed substantially of monomers together with any solvent or diluent and dissolved polymer. Catalyst along with cocatalyst and, optionally, chain transfer agent, are continuously or intermittently introduced in the reactor liquid phase or any recycled portion thereof. The reactor temperature may be controlled by adjusting the solvent/monomer ratio, the catalyst addition rate, as well as by use of cooling or heating coils, jackets or both. The polymerization rate is controlled by the rate of catalyst addition. Pressure is controlled by the monomer flow rate and partial pressures of volatile components. The propylene content of the polymer product is determined by the ratio of propylene to comonomer in the reactor, which is controlled by manipulating the respective feed rates of these components to the reactor. The polymer product molecular weight is controlled, optionally, by controlling other polymerization variables such as the temperature, monomer concentration, or flow rate of the previously mentioned chain transfer agent. Upon exiting the reactor, the effluent is contacted with a catalyst kill agent such as water, steam, or an alcohol. The polymer solution is optionally heated, and the polymer product is recovered by flashing off gaseous unreacted monomers as well as residual solvent or diluent at reduced pressure, and, if necessary, conducting further devolatilization in equipment, such as, a devolatilizing extruder. In a continuous process, the mean residence time of the catalyst and polymer in the reactor generally is from 5 minutes to 8 hours, and, in some embodiments, is from 10 minutes to 6 hours.

Without limiting in any way the scope of the invention, another means for making a propylene interpolymer as described herein is as follows: continuous solution polymerizations may be carried out in a computer controlled autoclave reactor equipped with an internal stirrer. Purified mixed alkanes solvent (ISOPAR™ E available from ExxonMobil Chemical Company.), ethylene, propylene, and hydrogen may be continuously supplied to a 3.8 L reactor equipped with a jacket for temperature control and an internal thermocouple. The solvent feed to the reactor may be measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows may be measured by mass flow meters and controlled by control valves or by the manual adjustment of needle valves. The remaining solvent is combined with monomers and hydrogen and fed to the reactor. A mass flow controller is used to deliver hydrogen to the reactor as needed. The temperature of the solvent/monomer solution is controlled by use of a heat exchanger before entering the reactor. This stream enters the bottom of the reactor.

The catalyst and cocatalyst component solutions may be metered using pumps and mass flow meters and are combined with the catalyst flush solvent and introduced into the bottom of the reactor. The catalyst may be a metal complex as described above. In some embodiments, the catalyst may be bis((2-oxoyl-3-(dibenzo-1H-pyrrole-1-yl)-5-(methyl)phenyl)-2-phenoxymethyl)-methylenetrans-1,2-cyclohexanediylhafnium (IV) dimethyl, as outlined above. The cocatalyst may be a long-chain alkyl ammonium borate of approximate stoichiometry equal to methyldi(octadecyl)ammonium tetrakis(pentafluorophenyl)borate (MDB) combined with a tertiary component, tri(isobutyl)aluminum-modified methalumoxane (MMAO) containing a molar ratio of i-butyl/methyl groups of about 1/3. The catalyst/cocatalyst may have a molar ratio based on Hf of 1.0/1 to 1.5/1, and MMAO (ratio of 25/1-35/1, Al/Hf). The reactor may be run liquid-full at 500-525 psig (3.45-3.62 MPa) with vigorous stirring. The reactor temperature may range from 125° C. to 165° C. and the propylene conversion percent may be about 80%. The reactor operates at a polymer concentration of between about 15 to 20 wt. %. The propylene conversion in the reactor may be maintained by controlling the catalyst injection rate. The reaction temperature may be maintained by controlling the water temperature across the shell side of the heat exchanger. The polymer molecular weight may be maintained by controlling the hydrogen flow.

Product is removed through exit lines at the top of the reactor. All exit lines from the reactor are steam traced and insulated. Polymerization may be stopped by the addition of a small amount of water into the exit line along with any stabilizers or other additives and passing the mixture through a static mixer. The product stream may then be heated by passing through a heat exchanger before devolatilization. The polymer product may be recovered by extrusion using a devolatilizing extruder and water cooled pelletizer.

Exemplary propylene interpolymers may include Exxon-Mobil Chemical Company VISTAMAXX™ polymers, and VERSIFY™ polymers by The Dow Chemical Company.

In embodiments herein, the propylene interpolymers have a density of from 0.840 g/cm$^3$ to 0.900 g/cm$^3$, as measured by ASTM D-792. All individual values and subranges of from 0.840 g/cm$^3$ to 0.900 g/cm$^3$ are included and disclosed herein. For example, in some embodiments the propylene interpolymer has a density of from 0.850 g/cm$^3$ to 0.890 g/cm$^3$, from 0.850 g/cm$^3$ to 0.880 g/cm$^3$, or from 0.850 g/cm$^3$ to 0.870 g/cm$^3$.

In addition to the density, the propylene interpolymers have a differential scanning calorimetry ("DSC") melting peak temperature of from 50.0° C. to 120.0° C. All individual values and subranges of from 50.0° C. to 120.0° C. are included and disclosed herein. For example, in some embodiments the propylene interpolymer has a highest DSC melting peak temperature of from 50.0° C. to 115.0° C., from 50.0° C. to 110.0° C., from 50.0° C. to 100.0° C., or from 50.0° C. to 105.0° C.

In addition to the density and the DSC melting peak temperature, the propylene interpolymers have a melt flow rate of from 1 to 100 g/10 min, as measured according to ASTM D-1238 (2.16 kg, 230° C.). All individual values and subranges of 1 to 100 g/10 min are included and disclosed herein. For example, in some embodiments, the propylene interpolymers have a melt flow rate of from 1 to 50 g/10 min, or from 1 to 30 g/10 min.

In addition to the density, the DSC melting peak temperature, and the melt flow rate, the propylene interpolymers have a molecular weight distribution (MWD) of less than 4.0. Molecular weight distribution (MWD) is the ratio of the weight average molecular weight to the number average molecular weight (Mw/Mn). The molecular weights may be determined by gel permeation chromatography. All individual values and subranges of less than 4.0 are included and disclosed herein. For example, in some embodiments, the propylene interpolymers have a molecular weight distribution of from 2.0 to 4.0, 2.0 to 3.7, 2.0 to 3.5, 2.0 to 3.2, 2.0 to 3.0, or 2.0 to 2.8.

In addition to the density, the DSC melting peak temperature, the melt flow rate, and the MWD, the propylene interpolymers may have a weight average molecular weight (Mw) of at least 50,000 g/mol. All individual values and subranges of at least 50,000 g/mol are included and disclosed herein. For example, in some embodiments, the propylene interpolymers may have a weight average molecular weight (Mw) of between 50,000 and 1,000,000 g/mol, between 50,000 and 500,000 g/mol, between 50,000 and 400,000 g/mol, or between 50,000 and 300,000 g/mol.

In addition to the density, the DSC melting peak temperature, the melt flow rate, the MWD, and the weight average molecular weight, the propylene interpolymers may have a percent crystallinity, as determined by DSC, in the range of from 0.5% to 45%. All individual values and subranges of from 0.5% to 45% are included and disclosed herein. For example, in some embodiments, the propylene interpolymers may have a percent crystallinity, as determined by DSC, in the range of from 2%-42%.

In embodiments herein, the cling layer comprises from 3 wt. % to 30 wt. % of the propylene interpolymer. All individual values and subranges of from 3 wt. % to 30 wt. % are included and disclosed herein. For example, in some embodiments, the cling layer comprises from 3 wt. % to 25 wt. %, 3 wt. % to 20 wt. %, or 3 wt. % to 15 wt. %, by weight of the cling layer, of the propylene interpolymer.

Optionally, the cling layer can include one or more additives, such as pigments, inorganic fillers, UV stabilizers, antioxidants, etc., and/or additional polymers. For example, in some embodiments, the cling layer can be dry blended or melt-blended with from 70 wt. % to 95 wt. % or 85 wt. % to 95 wt. % of a linear low density polyethylene or a cling layer polyethylene composition to form a cling layer blend. The cling layer polyethylene composition comprises the reaction product of ethylene and, optionally, one or more alpha olefin comonomers, wherein the cling layer polyethylene composition is characterized by one or more of the following properties: (a) a melt index, I2, of from 2.5 to 12.0 g/10 min or 2.5 to 8.0; (b) a density of from 0.910 to 0.925 g/cc or 0.912 to 0.920 g/cc; (c) a melt flow ratio, I10/I2, of from 6.0 to 7.6 or 6.4 to 7.4; and (d) a molecular weight distribution, (Mw/Mn) of from 2.25 to 4.0 or 2.6 to 3.5. The linear low density polyethylene may have a density in the range in the range of 0.912 to 0.940 grams/cm$^3$ and a melt index in the range of 0.5 to 30 grams/10 minutes. The cling layer polyethylene composition is formed in the presence of a catalyst composition comprising a multi-metallic procatalyst via solution polymerization. In further embodiments, the cling layer polyethylene composition may have a CDBI of less than 60% or from 40% to 60%. Exemplary LLDPE for use in the release layer of a multilayer film is commercially available under the trade names ELITE™, TUFLIN™, and DOWLEX™ from the Dow Chemical Company. Methods of dry blending resins can be found in U.S. Pat. No. 3,318,538 (Needham), the entirety of which patent is incorporated herein by reference. Methods of melt blending resins can be found in U.S. Pat. No. 6,111,019 (Arjunan et al.), the entirety of which patent is incorporated herein by reference.

Core Layer

The core layer comprises a core layer polyethylene composition that comprises the reaction product of ethylene and, optionally, one or more alpha olefin comonomers. The core layer polyethylene composition comprises greater than 50 wt. % of the units derived from ethylene and less than 30 wt. % of the units derived from one or more alpha-olefin comonomers. In some embodiments, the core layer polyethylene composition comprises (a) greater than or equal to 55%, for example, greater than or equal to 60%, greater than or equal to 65%, greater than or equal to 70%, greater than or equal to 75%, greater than or equal to 80%, greater than or equal to 85%, greater than or equal to 90%, greater than or equal to 92%, greater than or equal to 95%, greater than or equal to 97%, greater than or equal to 98%, greater than or equal to 99%, greater than or equal to 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene; and (b) optionally, less than 30 percent, for example, less than 25 percent, or less than 20 percent, less than 18%, less than 15%, less than 12%, less than 10%, less than 8%, less than 5%, less than 4%, less than 3%, less than 2%, less than 1%, from 0.1 to 20%, from 0.1 to 15%, 0.1 to 12%, 0.1 to 10%, 0.1 to 8%, 0.1 to 5%, 0.1 to 3%, 0.1 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more a-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable comonomers may include alpha-olefin comonomers, typically having no more than 20 carbon atoms. The one or more alpha-olefins may be selected from the group consisting of C3-C20 acetylenically unsaturated monomers and C4-C18 diolefins. Those skilled in the art will understand that the selected monomers are desirably those that do not destroy conventional Ziegler-Natta catalysts. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene. In some embodiments, the core layer polyethylene composition comprises greater than 0 wt. % and less than 30 wt. % of units derived from one or more of octene, hexene, or butene comonomers.

In some embodiments, the core layer polyethylene composition of the core layer is formed in the presence of a catalyst composition comprising a multi-metallic procatalyst via solution polymerization. The multi-metallic procatalyst used in producing the reaction product is at least trimetallic, but may also include more than three transition metals, and thus may in one embodiment be defined more comprehensively as multi-metallic. These three, or more, transition metals are selected prior to production of the catalyst. In a particular embodiment, the multi-metal catalyst comprises titanium as one element.

The catalyst compositions may be prepared beginning first with preparation of a conditioned magnesium halide based support. Preparation of a conditioned magnesium halide based support begins with selecting an organomagnesium compound or a complex including an organomagnesium compound. Such compound or complex is desirably soluble in an inert hydrocarbon diluent. The concentrations of components are preferably such that when the active halide, such as a metallic or non-metallic halide, and the magnesium complex are combined, the resultant slurry is from about 0.005 to about 0.25 molar (moles/liter) with respect to magnesium. Examples of suitable inert organic diluents include liquefied ethane, propane, isobutane, n-butane, n-hexane, the various isomeric hexanes, isooctane, paraffinic mixtures of alkanes having from 5 to 10 carbon atoms, cyclohexane, methylcyclopentane, dimethylcyclohexane, dodecane, industrial solvents composed of saturated or aromatic hydrocarbons such as kerosene, naphthas, and combinations thereof, especially when freed of any olefin compounds and other impurities, and especially those having boiling points in the range from about −50° C. to about 200° C. Also included as suitable inert diluents are ethylbenzene, cumene, decalin and combinations thereof.

Suitable organomagnesium compounds and complexes may include, for example, magnesium C2-C8 alkyls and aryls, magnesium alkoxides and aryloxides, carboxylated magnesium alkoxides, and carboxylated magnesium aryloxides. Preferred sources of magnesium moieties may include the magnesium C2-C8 alkyls and C1-C4 alkoxides. Such organomagnesium compound or complex may be reacted with a metallic or non-metallic halide source, such as a chloride, bromide, iodide, or fluoride, in order to make a magnesium halide compound under suitable conditions. Such conditions may include a temperature ranging from −25° C. to 100° C., alternatively, 0° C. to 50° C.; a time ranging from 1 to 12 hours, alternatively, from 4 to 6 hours; or both. The result is a magnesium halide based support.

The magnesium halide support is then reacted with a selected conditioning compound containing an element selected from the group consisting of boron, aluminum, gallium, indium and tellurium, under conditions suitable to form a conditioned magnesium halide support. This compound and the magnesium halide support are then brought into contact under conditions sufficient to result in a conditioned magnesium halide support. Such conditions may include a temperature ranging from 0° C. to 50° C., or alternatively, from 25° C. to 35° C.; a time ranging from 4 to 24 hours, or alternatively, from 6 to 12 hours; or both. The conditioning compound has a molar ratio constitution that is specific and which is believed to be an important feature in ensuring the desirable catalyst performance. Specifically, the procatalyst desirably exhibits a molar ratio of the magnesium to the conditioning compound that ranges from 3:1 to 6:1. Without wishing to be bound by any theory of mechanism, it is suggested that this aging serves to facilitate or enhance adsorption of additional metals onto the support.

Once the conditioned support is prepared and suitably aged, it is brought into contact with a titanium compound which may be added individually or as a mixture with the "second metal". In certain preferred embodiments titanium halides or alkoxides, or combinations thereof, may be selected. Conditions may include a temperature within the range from 0° C. to 50° C., alternatively from 25° C. to 35° C.; a time from 3 hours to 24 hours, alternatively from 6 hours to 12 hours; or both. The result of this step is adsorption of at least a portion of the titanium compound onto the conditioned magnesium halide support.

Finally, one or two additional metals, referred to herein as "the second metal" and "the third metal" for convenience, will also be adsorbed onto the magnesium-based support, The "second metal" and the "third metal" are independently selected from zirconium (Zr), hafnium (Hf), vanadium (V), niobium (Nb), tantalum (Ta), chromium (Cr), molybdenum (Mo), and tungsten (W). These metals may be incorporated in any of a variety of ways known to those skilled in the art, but generally contact between the conditioned magnesium based halide support including titanium and the selected second and third metals, in, e.g., liquid phase such as an appropriate hydrocarbon solvent, will be suitable to ensure deposition of the additional metals to form what may now be referred to as the "procatalyst," which is a multi-metallic procatalyst.

The multi-metallic procatalyst has a molar ratio constitution that is specific and which is believed to be an important feature in ensuring the desirable polymer properties that may be attributed to the catalyst made from the procatalyst. Specifically, the procatalyst desirably exhibits a molar ratio of the magnesium to a combination of the titanium and the second and third metals that ranges from 30:1 to 5:1; under conditions sufficient to form a multi-metallic procatalyst. Thus, the overall molar ratio of magnesium to titanium ranges from 8:1 to 80:1.

Once the procatalyst has been formed, it may be used to form a final catalyst by combining it with a cocatalyst consisting of at least one organometallic compound such as an alkyl or haloalkyl of aluminum, an alkylaluminum halide, a Grignard reagent, an alkali metal aluminum hydride, an alkali metal borohydride, an alkali metal hydride, an alkaline earth metal hydride, or the like. The formation of the final catalyst from the reaction of the procatalyst and the organometallic cocatalyst may be carried out in situ, or just prior to entering the polymerization reactor. Thus, the combination of the cocatalyst and the procatalyst may occur under a wide variety of conditions. Such conditions may include, for example, contacting them under an inert atmosphere such as nitrogen, argon or other inert gas at temperatures in the range from 0° C. to 250° C., preferably from 15° C. to 200° C. In the preparation of the catalytic reaction product, it is not necessary to separate hydrocarbon soluble components from hydrocarbon insoluble components. Time for contact between the procatalyst and cocatalyst may desirably range, for example, from 0 to 240 seconds, preferably from 5 to 120 seconds. Various combinations of these conditions may be employed.

In embodiments described herein, the core layer polyethylene composition may have a metal catalyst residual of greater than or equal to 1 parts by combined weight of at least three metal residues per one million parts of polyethylene polymer, wherein the at least three metal residues are selected from the group consisting of titanium, zirconium, hafnium, vanadium, niobium, tantalum, chromium, molybdenum, tungsten, and combinations thereof, and wherein each of the at least three metal residues is present at greater than or equal to 0.2 ppm, for example, in the range of from 0.2 to 5 ppm. All individual values and subranges from greater than or equal to 0.2 ppm are included herein and disclosed herein; for example, the core layer polyethylene composition may further comprise greater than or equal to 2 parts by combined weight of at least three metal residues remaining from the multi-metallic polymerization catalyst per one million parts of the core layer polyethylene composition.

In some embodiments, the core layer polyethylene composition comprises at least 0.75 ppm of V (Vanadium). All individual values and subranges from at least 0.75 ppm of V are included and disclosed herein; for example the lower limit of the V in the core layer polyethylene composition may be 0.75, 1, 1.1, 1.2, 1.3 or 1.4 ppm to an upper limit of the V in the core layer polyethylene composition may be 5, 4, 3, 2, 1.9, 1.8, 1.7, 1.6, 1.5, or 1 ppm. The vanadium catalyst metal residual concentration for the core layer polyethylene composition can be measured using the Neutron Activation Method for Metals described below.

In some embodiments, the core layer polyethylene composition comprises at least 0.3 ppm of Zr (Zirconium). All individual values and subranges of at least 0.3 ppm of Zr are included and disclosed herein; for example the lower limit of the Zr in the core layer polyethylene composition may be 0.3, 0.4, 0.5, 0.6 or 0.7 ppm. In yet another embodiment, the upper limit of the Zr in the core layer polyethylene composition may be 5, 4, 3, 2, 1, 0.9, 0.8 or 0.7 ppm. The zirconium catalyst metal residual concentration for the core layer polyethylene composition can be measured using the Neutron Activation Method for Metals described below.

In embodiments described herein, the core layer polyethylene composition may have a density of 0.910 g/cc to 0.925 g/cc. All individual values and subranges of at least 0.910 g/cc to 0.925 g/cc are included and disclosed herein. For example, in some embodiments, the polyethylene has a density of 0.910 to 0.923 g/cc, 0.912 to 0.923 g/cc, or 0.912 to 0.920 g/cc. Density may be measured in accordance with ASTM D792.

In addition to the density, the core layer polyethylene composition may have a melt index, I2, of 2.5 g/10 min to 12.0 g/10 min. All individual values and subranges of at least 2.5 g/10 min to 12.0 g/10 min are included and disclosed herein. For example, in some embodiments, the core layer polyethylene composition may have a melt index, I2, of 2.5 g/10 min to 10.0 g/10 min, 2.5 g/10 min to 8.0 g/10 min, or 2.5 g/10 min to 5.0 g/10 min. Melt index, I2, may be measured in accordance with ASTM D1238 (190° C. and 2.16 kg).

In addition to the density and melt index, I2, the core layer polyethylene composition may have a melt flow ratio, I10/I2, of from 6.0 to 7.6. All individual values and subranges of from 6.0 to 7.6 are included and disclosed herein. For example, in some embodiments, the core layer polyethylene composition may have a melt flow ratio, I10/I2, ranging from a lower limit of 6.0, 6.2, 6.3, or 6.5 to an upper limit of 7.6, 7.5, 7.3, 7.1, or 7.0. In other embodiments, the core layer polyethylene composition may have a melt flow ratio, I10/I2, of from 6.0 to 7.4 or 6.4 to 7.4. Melt index, I10, may be measured in accordance with ASTM D1238 (190° C. and 10.0 kg).

In addition to the density, melt index, I2, and melt flow ratio, I10/I2, the core layer polyethylene composition may have a molecular weight distribution (Mw/Mn) of from 2.25 to 4.0. All individual values and subranges of from 2.25 to 4.0 are included and disclosed herein. For example, the core layer polyethylene composition may have an Mw/Mn ratio from a lower limit of 2.5, 2.6, 2.7, or 2.8 to an upper limit of 4.0, 3.9, 3.7, 3.5, 3.2, or 3.0. In some embodiments, the core layer polyethylene composition may have an Mw/Mn ratio of from 2.5 to 3.5, 2.6 to 3.5, or 2.6 to 3.2. Molecular weight distribution can be described as the ratio of weight average molecular weight ($M_w$) to number average molecular weight ($M_n$) (i.e., $M_w/M_n$), and can be measured by gel permeation chromatography techniques.

In addition to the density, melt index, I2, melt flow ratio, I10/I2, and molecular weight distribution (Mw/Mn), the core layer polyethylene composition may have a number average molecular weight, Mn (g/mol), of from 30,000 to 50,000 g/mol. All individual values and subranges of from 30,000 to 50,000 g/mol are included and disclosed herein. For example, the core layer polyethylene composition may have a Mn from 33,000 to 50,000 g/mol, 33,000 to 45,000 g/mol, or 33,000 to 40,000 g/mol.

In addition to the density, melt index, I2, melt flow ratio, I10/I2, molecular weight distribution (Mw/Mn), and number average molecular weight, the core layer polyethylene composition may have a weight average molecular weight, Mw (g/mol), of from 60,000 to 110,000 g/mol. All individual values and subranges of from 60,000 to 110,000 g/mol are included and disclosed herein. For example, the core layer polyethylene composition may have an Mw from 65,000 to 105,000 g/mol, 75,000 to 100,000 g/mol, or 85,000 to 100,000 g/mol.

In addition to the density, melt index, I2, melt flow ratio, I10/I2, molecular weight distribution (Mw/Mn), number average molecular weight, and weight average molecular weight, the core layer polyethylene composition may have a z average molecular weight, Mz (g/mol), of from 200,000 to 325,000 g/mol. All individual values and subranges of from 200,000 to 325,000 g/mol are included and disclosed herein. For example, the core layer polyethylene composition may have an Mz from 240,000 to 325,000, 240,000 to 315,000 g/mol, or 240,000 to 300,000 g/mol.

In addition to the density, melt index, I2, melt flow ratio, I10/I2, molecular weight distribution (Mw/Mn), number average molecular weight, weight average molecular weight, and z average molecular weight, the core layer polyethylene composition may have a viscosity ratio (viscosity at 0.1 rad/s/viscosity at 100 rad/s, both measured at 190° C.) of 2 to 6. All individual values and subranges of from 2 to 6 are included and disclosed herein. For example, the core layer polyethylene composition may have a viscosity ratio of from 2 to 4, 2.0 to 2.9, or 2.5 to 3.5.

In addition to the density, melt index, I2, melt flow ratio, I10/I2, molecular weight distribution (Mw/Mn), number average molecular weight, weight average molecular weight, z average molecular weight, and viscosity ratio, the core layer polyethylene composition may have a tan delta at 0.1 rad/s measured at 190° C. of 15 to 40. All individual values and subranges of from 15 to 40 are included and disclosed herein. For example, the core layer polyethylene composition may have a tan delta at 0.1 rad/s measured at 190° C. of from 20 to 40 or 25 to 40.

In addition to the density, melt index, I2, melt flow ratio, I10/I2, molecular weight distribution (Mw/Mn), number average molecular weight, weight average molecular weight, z average molecular weight, viscosity ratio, and tan delta, the core layer polyethylene composition may have a composition distribution breadth index, CDBI, of less than 60%. All individual values and subranges of less than 60% are included and disclosed herein. For example, in some embodiments, the core layer polyethylene composition may have a CDBI of from 37% to 60% or 40% to 60%.

The CDBI may be defined as the weight percent of the polymer molecules having a comonomer content within 50 percent of the median total molar comonomer content. The CDBI of linear polyethylene, which does not contain a comonomer, is defined to be 100%. The CDBI of a copolymer is readily calculated from data obtained from crystallization elution fractionation ("CEF") as described below. Unless otherwise indicated, terms such as "comonomer content", "average comonomer content" and the like refer to the bulk comonomer content of the indicated interpolymer blend, blend component, or fraction on a molar basis.

In embodiments herein, the core layer comprises from 60 wt. % to 100 wt. % of the core layer polyethylene composition. All individual values and subranges of from 60 wt. % to 100 wt. % are included and disclosed herein. For example, in some embodiments, the core layer comprises from 70 wt. % to 100 wt. %, 80 wt. % to 100 wt. %, 90 wt. % to 100 wt. %, or 95 wt. % to 100 wt. % by weight of polymers present in the core layer, of the core layer polyethylene composition.

In embodiments described herein, the core layer may further comprise a linear low density polyethylene (LLDPE), low density polyethylene (LDPE), or blends thereof. In some embodiments, the core layer may further comprise an LLDPE, LDPE, or blends thereof in an amount ranging from 1 wt. % to 40 wt. %, 1 wt. % to 30 wt. %, 1 wt. % to 25 wt. %, 5 wt. % to 25 wt. %, or 5 wt. % to 20 wt. %, by weight of the core layer. The LLDPE may have a density in the range of 0.912 to 0.940 grams/cm³ and a melt index in the range of 0.5 to 30 grams/10 minutes. The LDPE may have a density in the range of 0.910 to 0.935 g/cm³ and a melt index in the range of 0.2 to 20 g/10 min. The core layer may further comprise one or more additives, such as pigments, inorganic fillers, UV stabilizers, antioxidants, etc.

Release Layer

The release layer comprises one or more of LDPE, LLDPE, or a release layer polyethylene composition characterized by the following properties: (a) a melt index, I2, of from 2.5 to 12.0 g/10 min or 2.5 to 8.0 g/10 min; (b) a density of from 0.910 to 0.925 g/cc or 0.912 to 0.920 g/cc; (c) a melt flow ratio, I10/I2, of from 6.0 to 7.6 or 6.4 to 7.4; and (d) a molecular weight distribution, (Mw/Mn) of from 2.25 to 4.0 or 2.6 to 3.5. The release layer polyethylene composition is formed in the presence of a catalyst composition comprising a multi-metallic procatalyst via solution polymerization. In further embodiments, the release layer polyethylene composition may have a CDBI of less than 60% or from 40% to 60%. The LLDPE may have a density in the range in the range of 0.912 to 0.940 grams/cm³ and a melt index in the range of 0.5 to 30 grams/10 minutes. Exemplary LLDPE for use in the release layer of a multilayer film is commercially available under the trade names ELITE™, TUFLIN™, and DOWLEX™ from the Dow Chemical Company.

In some embodiments, the release layer comprises LLDPE in an amount from 0 to 100 percent, 50 to 100 percent, 75 to 100 percent, 85 to 100 percent, or 95 to 100 percent, by weight of the polymers present in the release layer. In other embodiments, the release layer comprises the release layer polyethylene composition in an amount from 0 to 100 percent, 50 to 100 percent, 75 to 100 percent, 85 to 100 percent, or 95 to 100 percent, by weight of the polymers present in the release layer. In further embodiments, the release layer may comprise LLDPE and the release layer polyethylene composition in a weight ratio ranging from 1:4 to 4:1 or 1:3 to 3:4. The release layer may further comprise one or more additives, such as pigments, inorganic fillers, UV stabilizers, antioxidants, etc.

The multilayer films described herein can be made by a variety of techniques, such as, cast film techniques, including mono- and biaxial orientation, as is generally known in the art. The multilayer films described herein may also be advantageously stretched at least 50%, preferably 100% in the machine and/or cross directions. In some embodiments, a multilayer cast film can be made by co-extruding a cling layer composition, a core layer composition, and a release layer composition to form a multilayer cast film. The cling layer composition comprises a propylene interpolymer as previously described herein, and may optionally include a cling layer polyethylene composition as previously described herein; the core layer composition comprises a core layer polyethylene composition as previously described herein; and the release layer composition comprises a linear low density polyethylene or a release layer polyethylene composition as previously described herein. The core layer polyethylene composition, the cling layer polyethylene composition, and the release layer polyethylene composition, used in the multilayer cast film may independently be the same or different from each other.

Embodiments of the multilayer cast films will now be further described in the following illustrative examples.

Test Methods

Density

Density can be measured in accordance with ASTM D-792, and is reported in grams/cubic centimeter (g/cc or g/cm³).

Melt Index/Melt Flow Rate

Melt index (I2), for ethylene-based polymers, is measured in accordance with ASTM D 1238-10, Condition, 190° C./2.16 kg, and is reported in grams eluted per 10 minutes. Melt index (I10), for ethylene-based polymers, is measured in accordance with ASTM D 1238-10, Condition 190° C./10 kg, and is reported in grams eluted per 10 minutes. Melt Flow Rate, MFR2, for propylene-based polymers is measured in accordance with ASTM D 1238-10, Condition 230° C./2.16 kg, and is reported in grams eluted per 10 minutes. Melt Flow Rate, MFR10, for propylene-based polymers is measured in accordance with ASTM D 1238-10, Condition 230° C./10 kg, and is reported in grams eluted per 10 minutes.

High Temperature Gel Permeation Chromatography (HT-GPC)

Propylene Interpolymers

The polymers are analyzed by gel permeation chromatography (GPC) on a Polymer Laboratories PL-GPC-220 high temperature chromatographic unit equipped with three linear mixed bed columns, 300×7.5 mm (Polymer Laboratories PLgel Mixed B (10-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol (BHT). The flow rate is 1.0 milliliter/minute and the injection size is 100 microliters. A 0.15% by weight solution of the sample is prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. BHT is used as a relative flowrate marker referencing each chromatographic run back to the polystyrene narrow standards calibration curve.

The equivalent polypropylene molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984), incorporated herein by reference) and polystyrene (as described by E. P. Otocka, R. J. Roe, N. Y. Hellman, P. M. Muglia, Macromolecules, 4, 507 (1971) incorporated herein by reference) in the Mark-Houwink equation (EQ 1), which relates intrinsic viscosity to molecular weight. The instantaneous molecular weight ($M_{(PP)}$) at each chromatographic point is determined by EQ 2, using universal calibration and the Mark-Houwink coefficients as defined in EQ 1. The number-average, weight-average, and z-average molecular weight moments, Mn, Mw, and Mz are calculated according to EQ 3, EQ 4, and EQ 5, respectively, wherein RI is the baseline-subtracted refractometer signal height of the polymer elution peak at each chromatographic point (i).

$$\{\eta\}=KM^a \quad (EQ\ 1)$$

where $K_{pp}=1.90E-04$, $a_{pp}=0.725$ and $K_{ps}=1.26E-04$, $a_{ps}=0.702$.

$$M_{(PP)} = \left(\frac{K_{PS} M_{PS}^{a_{PS}+1}}{K_{PP}}\right)^{\frac{1}{a_{PP}+1}} \quad (EQ\ 2)$$

$$Mn_{(GPC)} = \frac{\sum_i RI_i}{\sum_i (RI_i / M_{(PP)_i})} \quad (EQ\ 3)$$

$$Mw_{(GPC)} = \frac{\sum_i (RI_i * M_{(PP)_i})}{\sum_i RI_i} \quad (EQ\ 4)$$

$$Mz_{(GPC)} = \frac{\sum_i (RI_i * M_{(PP)_i}^2)}{\sum_i (RI_i * M_{(PP)_i})} \quad (EQ\ 5)$$

Ethylene-Based Polymers

A PolymerChar (Valencia, Spain) high temperature Gel Permeation Chromatography system consisting of an infrared concentration detector (IR-5) is used for MW and MWD determination. The solvent delivery pump, the on-line solvent degas device, auto-sampler, and column oven are from Agilent. The column compartment and detector compartment are operated at 150° C. The columns are three PLgel 10 μm Mixed-B, columns (Agilent). The carrier solvent is 1,2,4-trichlorobenzene (TCB) with a flow rate of 1.0 mL/min. Both solvent sources for chromatographic and sample preparation contained 250 ppm of butylated hydroxytoluene (BHT) and are nitrogen sparged. Polyethylene samples are prepared at targeted polymer concentrations of 2 mg/mL by dissolving in TCB at 160° C. for 3 hour on the auto-sampler just prior the injection. The injection volume is 200 μL.

Calibration of the GPC column set is performed with 21 narrow molecular weight distribution polystyrene standards. The molecular weights of the standards ranged from 580 to 8,400,000 g/mol, and are arranged in 6 "cocktail" mixtures, with at least a decade of separation between individual molecular weights. The polystyrene standard peak molecular weights are converted to polyethylene molecular weights using the following equation (as described in Williams and Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is around 0.42.

A third order polynomial is used to fit the respective polyethylene-equivalent calibration points obtained from equation (1) to their observed elution volumes. The actual polynomial fit is obtained so as to relate the logarithm of polyethylene equivalent molecular weights to the observed elution volumes (and associated powers) for each polystyrene standard.

Number-, weight- and z-average molecular weights are calculated according to the following equations:

$$\overline{Mn} = \frac{\sum_i Wf_i}{\sum_i (Wf_i / M_i)} \quad (2)$$

$$\overline{Mw} = \frac{\sum_i (Wf_i * M_i)}{\sum_i Wf_i} \quad (3)$$

$$\overline{Mz} = \frac{\sum_i (Wf_i * M_i^2)}{\sum_i (Wf_i * M_i)} \quad (4)$$

Where, $Wf_i$ is the weight fraction of the i-th component and $M_i$ is the molecular weight of the i-th component. The MWD is expressed as the ratio of the weight average molecular weight (Mw) to the number average molecular weight (Mn).

The accurate A value is determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 120,000 g/mol.

Neutron Activation Method for Metals

Two sets of duplicate samples are prepared by transferring approximately 3.5 grams of the pellets into pre-cleaned 2 dram polyethylene vials. Standards are prepared for each metal tested from their NIST traceable standard solutions (Certi. pure from SPEX) into 2-dram polyethylene vials. They are diluted using milli-Q pure water to 6 ml and the vials are heat-sealed. The samples and standards are then analyzed for these elements, using a Mark I TRIGA nuclear reactor. The reactions and experimental conditions used for these elements are summarized in the table below. The samples are transferred to un-irradiated vials before doing the gamma-spectroscopy. The elemental concentrations are calculated using CANBERRA software and standard comparative technique. Table 1 provides measurement parameters for metals determination.

TABLE 1

Reactions and experimental conditions used for elements during neutron activation.

| Elements | Nuclear reaction | Isotope | Half life | Reactor Power |
|---|---|---|---|---|
| Al | $^{27}Al(n, \gamma)^{28}Al$ | $^{28}Al$ | 2.24 m | 250 kW |
| Cl | $^{37}Cl(n, \gamma)^{38}Cl$ | $^{38}Cl$ | 37.2 m | 250 kW |
| Cr | $^{50}Cr(n, \gamma)^{51}Cr$ | $^{51}Cr$ | 27.7 d | 250 kW |
| Hf | $^{180}Hf(n, \gamma)^{181}Hf$ | $^{181}Hf$ | 42.4 d | 250 kW |
| Mg | $^{26}Mg(n, \gamma)^{27}Mg$ | $^{27}Mg$ | 9.46 m | 250 kW |
| Mo | $^{98}Mo(n, \gamma)^{99}Mo$ | $^{99}Mo$ | 66.0 h | 250 kW |
| Nb | $^{93}Nb(n, \gamma)^{94m}Nb$ | $^{94m}Nb$ | 6.26 m | 250 kW |
| Ta | $^{181}Ta(n, \gamma)^{182}Ta$ | $^{182}Ta$ | 114.4 d | 250 kW |
| Ti | $^{50}Ti(n, \gamma)^{51}Ti$ | $^{51}Ti$ | 5.76 m | 250 kW |
| W | $^{186}W(n, \gamma)^{187}W$ | $187W$ | 23.7 h | 250 kW |
| V | $^{51}V(n, \gamma)^{52}V$ | $52V$ | 3.75 m | 250 kW |
| Zr | $^{96}Zr(n, \gamma)^{97}Zr$ | $^{97}Zr$ | 16.91 h | 250 kW |

| Elements | Irradiation Time | Waiting Time | Counting Time | Gamma Energy, keV |
|---|---|---|---|---|
| Al | 2 m | 4 m | 4.5 min | 1778.5 |
| Cl | 2 m | 4 m | 4.5 min | 1642.5, 2166.5 |
| Cr | 90 m | 5 h | 1.6 h | 320 |
| Hf | 90 m | 5 h | 1.6 h | 133, 482 |
| Mg | 2 m | 4 m | 4.5 min | 843.8, 1014 |
| Mo | 90 m | 5 h | 1.6 h | 181, 739.7, 141 |
| Nb | 2 m | 4 m | 4.5 min | 871 |
| Ta | 90 m | 5 h | 1.6 h | 1121, 1222 |
| Ti | 2 m | 4 m | 4.5 min | 320 |
| W | 90 m | 5 h | 1.6 h | 135, 481 |
| V | 2 m | 4 m | 4.5 min | 1434 |
| Zr | 90 m | 5 h | 1.6 h | 743.4 |

Differential Scanning calorimetry (DSC)

DSC is used to measure the melting and crystallization behavior of a polymer over a wide range of temperatures. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (approx. 25° C.). The film sample is formed by pressing a "0.1 to 0.2 gram" sample at 175° C. at 1,500 psi, and 30 seconds, to form a "0.1 to 0.2 mil thick" film. A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C., and held isothermal for five minutes, in order to remove its thermal history. Next, the sample is cooled to −40° C., at a 10° C./minute cooling rate, and held isothermal at −40° C. for five minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), onset crystallization temperature (Tc onset), heat of fusion ($H_f$) (in Joules per gram), and the calculated % crystallinity for polyethylene samples using: % Crystallinity for PE=(($H_f$)/(292 J/g))×100, and the calculated % crystallinity for polypropylene samples using: % Crystallinity for PP=(($H_f$)/165 J/g))×100. The heat of fusion ($H_f$) and the peak melting temperature are reported from the second heat curve. Peak crystallization temperature and onset crystallization temperature are determined from the cooling curve.

Dynamic Mechanical Spectroscopy (DMS)

Resins are compression-molded into "3 mm thick×1 inch" circular plaques at 350° F., for five minutes, under 1500 psi pressure, in air. The sample is then taken out of the press, and placed on a counter to cool.

A constant temperature frequency sweep is performed using a TA Instruments "Advanced Rheometric Expansion System (ARES)," equipped with 25 mm (diameter) parallel plates, under a nitrogen purge. The sample is placed on the plate, and allowed to melt for five minutes at 190° C. The plates are then closed to a gap of "2 mm," the sample trimmed (extra sample that extends beyond the circumference of the "25 mm diameter" plate is removed), and then the test is started. The method had an additional five minute delay built in, to allow for temperature equilibrium. The experiments are performed at 190° C. over a frequency range of 0.1 to 100 rad/s. The strain amplitude is constant at 10%. The complex viscosity η*, tan (δ) or tan delta, viscosity at 0.1 rad/s (V0.1), the viscosity at 100 rad/s (V100), and the viscosity ratio (V0.1/V100) are calculated from these data.

Crystallization Elution Fractionation (CEF) Method

The Crystallization Elution Fractionation (CEF) technology is conducted according to Monrabal et al, Macromol. Symp. 257, 71-79 (2007). The CEF instrument is equipped with an IR-4 or IR-5 detector (such as that sold commercially from PolymerChar, Spain) and a two angle light scattering detector Model 2040 (such as those sold commercially from Precision Detectors). A 10 micron guard column of 50 mm×4.6 mm (such as that sold commercially from PolymerLabs) is installed before the IR-4 or IR-5 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for at least two hours before use. ODCB is sparged with dried nitrogen ($N_2$) for one hour before use. Dried nitrogen is obtained by passing nitrogen at <90 psig over $CaCO_3$ and 5 Å molecular sieves. ODCB is further dried by adding five grams of the dried silica to two liters of ODCB or by pumping through a column or columns packed with dried silica between 0.1 ml/min to 1.0 ml/min Eight hundred milligrams of BHT are added to two liters of ODCB if no inert gas such as $N_2$ is used in purging the sample vial. Dried ODCB with or without BHT is hereinafter referred to as "ODCB-m." A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 ml/min. The flow rate during elution is 0.50 ml/min. The IR-4 or IR-5 signal data is collected at one data point/second.

The CEF column is packed with glass beads at 125 μm±6% (such as those commercially available with acid wash from MO-SCI Specialty Products) with ⅛ inch stainless tubing according to U.S. Pat. No. 8,372,931. The internal liquid volume of the CEF column is between 2.1 ml and 2.3 ml. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 30.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

Comonomer Distribution Breadth Index (CDBI)

The CDBI is calculated using the methodology described in WO/93/03093 from data obtained from CEF. CDBI is defined as the weight percent of the polymer molecules having a comonomer content within 50 percent of the median total molar comonomer content. It represents a comparison of the comonomer distribution in the polymer to the comonomer distribution expected for a Bernoullian distribution.

CEF is used to measure the short chain branching distribution (SCBD) of the polyolefin. A CEF molar comonomer content calibration is performed using 24 reference materials (e.g., polyethylene octene random copolymer and ethylene butene copolymer) with a narrow SCBD having a comonomer mole fraction ranging from 0 to 0.108 and a Mw from 28,400 to 174,000 g/mole. The 1n (mole fraction of ethylene), which is the 1n (comonomer mole fraction), versus 1/T (K) is obtained, where T is the elution temperature in Kelvin of each reference material. The comonomer distribution of the reference materials is determined using 13C NMR analysis in accordance with techniques described, for example, in U.S. Pat. No. 5,292,845 (Kawasaki, et al.) and by J. C. Randall in Rev. Macromol. Chem. Phys., C29, 201-317.

13C-NMR

Sample Preparation

The samples are prepared by adding approximately 2.7 g of a 50/50 mixture of tetrachloroethane-d2/orthodichlorobenzene containing 0.025 M Cr(AcAc)3 to 0.25 g sample in a Norell 1001-7 10 mm NMR tube. The samples are dissolved and homogenized by heating the tube and its contents to 150° C. using a heating block and vortex mixer. Each sample is visually inspected to ensure homogeneity.

Data Acquisition Parameters

The data is collected using a Bruker 400 MHz spectrometer equipped with a Bruker Dual DUL high-temperature CryoProbe. The data is acquired using 320 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition. The $^{13}C$ NMR chemical shifts are internally referenced to the mmmm pentad at 21.90 ppm or the EEE triad at 30.0 ppm.

Data Analysis

Composition is determined using the assignments from S. Di Martino and M. Kecichtermans, "Determination of the Composition of Ethylene-Propylene-Rubbers Using 13C-NMR Spectroscopy," Journal of Applied Polymer Science, Vol. 56, 1781-1787 (1995), and integrated C13 NMR spectra to solve the vector equation s=fM where M is an assignment matrix, s is a row vector representation of the spectrum, and f is a mole fraction composition vector. The elements off are taken to be triads of E and O with all permutations of E and O. The assignment matrix M is created with one row for each triad in f and a column for each of the integrated NMR signals. The elements of the matrix are integral values determined by reference to the assignments in Ref. 1. The equation is solved by variation of the elements of f as needed to minimize the error function between s and the integrated C13 data for each sample. This is easily executed in Microsoft Excel using the Solver function.

Ultimate Stretch

Ultimate stretch is tested on a Highlight Film Test System from Highlight Industries. The film roll is placed on the unwind section of the machine and the film is passed through a set of rollers. The film is then unwound with increasing force until it reaches its ultimate stretch point. Load cells measure the amount of force applied and a calculation is made to determine the amount of stretch present in the film, measured in percent. Three measurements are taken and averaged together to obtain the average ultimate stretch value. The film width is 20 inches.

On Pallet Tear Test

This test uses a Bruceton staircase method to determine the maximum force to load at which the film can be passed over a test probe for three wraps with no failures. The test probe is inserted into the test stand at the desired protrusion distance. The film is positioned such that the test probe is aligned with the center of the film. The film is attached to the test stand and the wrapper started. Once the wrapper reaches 250% pre-stretch, the film is allowed to pass over the probe for a maximum of three wraps. Any breakage of the film during any of the wrap is considered a failure at that force to load setting. Depending on the performance of the film at the load setting (i.e. passed or failed), the force to load is adjusted up or down, and the test is repeated at the new load setting. This continues until the maximum force at which no failures occurs is found. The Table below provides the equipment and settings used in this method.

| Equipment: | Lantech SHC Film Test Wrapper |
|---|---|
| Pre-stretch: | 250% |
| Turntable Speed: | 10 rpm |
| Force to Load (F2): | Variable |
| Probe Type | 1" metal square pipe with a ½" razor blade attached |
| Probe Protrusion Distance | 1 in |

Stretch Force, Unwind Force, Sound Level:

Stretch Force, Unwind Force, Sound Level are tested on a Highlight Film Test System from Highlight Industries. The film roll is placed on the unwind section of the machine and the film is passed through a set of rollers. The film is then unwound with increasing force until it reaches its ultimate stretch point. Load cells measure the amount of force applied to stretch (stretch force) and the force required to unwind (unwind force). The sound level is measured during this test with a built in Sound Level Meter in decibels unit. Three measurements are taken for each test and the stretch force, unwind force and sound level values are averaged. The film width is 20 inches for these tests.

On-Pallet Puncture:

This test uses a Bruceton staircase method to determine the maximum force to load at which the film can be passed over a test probe for three wraps with no failures. The test probe is inserted into the test stand at the desired protrusion distance. The film is positioned such that the test probe is aligned with the center of the film. The film is attached to the test stand and the wrapper started. Once the wrapper reaches 250% pre-stretch, the film is allowed to pass over the probe for a maximum of three wraps. Any breakage of the film during any of the wrap is considered a failure at that force to load setting. Depending on the performance of the film at the load setting (i.e. passed or failed), the force to load is adjusted up or down, and the test is repeated at the new load setting. This continues until the maximum force at which no failures occurs is found. The Table below provides the equipment and settings used in this method.

| Equipment: | Lantech SHC Film Test Wrapper |
|---|---|
| Pre-stretch: | 250% |
| Turntable Speed: | 10 rpm |
| Force to Load (F2): | Variable |
| Probe Type | 4" by 4" blunt rod |
| Probe Protrusion Distance | 12 in |

Cling

On-pallet stretch cling (for stretch cling performance) can be measured by Lantech SHS test equipment. The test consists of stretching the film at 250% at a constant force F2 of 12 lbs. for 5 wraps with the turntable running at a rate of 10 rpm. The end of the film is then attached to a load cell which measures the amount of force, in grams, needed to pull the film off the drum.

Examples

The resins used in the multilayer cast films are shown in Tables 2, 3, & 5. The inventive propylene interpolymer is a propylene-ethylene copolymer and is prepared via the method described above in paras. [0018]-[0020]. Additional properties of the propylene interpolymers are outlined in Table 3 below. PE Resin 1 is produced via the method described below. Additional properties of PE Resin 1 and comparative polyethylene compositions are outlined in Table 5.

TABLE 2

Resin Properties

| Product | Description | Density (g/cm$^3$) | Melt index (MI or I2) (g/10 min) |
|---|---|---|---|
| FLEXUS ™ 7200XP, available from Braskem S.A. | LLDPE | See Table 5 | See Table 5 |
| LH-218A, available from Braskem S.A. | LLDPE | 0.916 | 2.3 |
| LL 4801N, available from Braskem S.A. | LLDPE | 0.917 | 2.1 |
| EXCEED ™ 3518CB, available from ExxonMobil Chemical Company | mLLDPE | See Table 5 | See Table 5 |
| LLDPE 1630, available from The Dow Chemical Company | LLDPE | See Table 5 | See Table 5 |
| DOWLEX ™ 2107B, available from The Dow Chemical Company | LLDPE | 0.918 | 2.6 |
| Propylene Interpolymer | Propylene-ethylene copolymer | See Table 3 | See Table 3 |
| VISTAMAXX ™ 6102, available from ExxonMobil Chemical Company | Propylene-ethylene copolymer | See Table 3 | See Table 3 |
| PE Resin 1 | Core layer polyethylene composition | See Table 5 | See Table 5 |

TABLE 3

Resin Properties

| | Propylene Interpolymer | VISTAMAXX ™ 6102 |
|---|---|---|
| Density (g/cm$^3$) | 0.867 | 0.862 |
| MFR$_2$ (g/10 minutes) | 8.0 | 3 |
| MFR$_{10}$/MFR$_2$ | 11.625 | |
| HT-GPC | | |
| M$_n$ (g/mol) | 84,490 | 124,600 |
| M$_w$ (g/mol) | 204,500 | 261,200 |
| M$_z$ (g/mol) | 396,300 | 443,600 |
| M$_w$/M$_n$ | 2.42 | 2.1 |
| DSC | | |
| Highest T$_m$ peak (° C.) | 62 | 104.3 |
| Tc (° C.) | 15 | — |
| % Crystallinity | 11.0 | 4.2 |
| Other Properties | | |
| % Comonomer | 11.4 | 16 |

PE Resin 1

PE Resin 1 is prepared as follows: a multi-metal catalyst is prepared (Catalyst 1). Catalyst 1 is then used to prepare PE Resin 1 in a solution polymerization.

Catalyst 1 Preparation

To approximately 109 kg of 0.20 M MgCl$_2$ slurry was added 7.76 kg of EADC solution (15 wt % in heptanes), followed by agitation for 8 hours. A mixture of TiCl$_4$/VOCl$_3$ (85 mL and 146 mL, respectively) was then added, followed by a solution of Zr(TMHD)$_4$ (0.320 kg of a 0.30 M solution in Isopar E). These two additions were performed sequentially within 1 hour of each other. The resulting catalyst premix was aged with agitation for an additional 8 h prior to use.

Production of PE Resin 1

PE Resin 1 is made according to the following procedures: All raw materials (ethylene, 1-hexene) and the process solvent (an isoparaffinic solvent under the tradename ISOPAR E, which is commercially available from Exxon-Mobil Corporation) are purified with molecular sieves before introduction into the reaction environment. Hydrogen is supplied in pressurized cylinders as a high purity grade and is not further purified. The reactor monomer feed (ethylene) stream is pressurized via a mechanical compressor to a pressure that is above the reaction pressure, e.g. 750 psig. The solvent and comonomer (1-hexene) feed is pressurized via a mechanical positive displacement pump to pressure that is above the reaction pressure, e.g. 750 psig. The individual catalyst components are manually batch diluted to specified component concentrations with purified solvent (ISOPAR E) and pressured to a pressure that is above the reaction pressure, e.g. 750 psig. All reaction feed flows are measured with mass flow meters and independently controlled with computer automated valve control systems.

The continuous solution polymerization reactor consists of a liquid full, non-adiabatic, isothermal, circulating, loop. Independent control of all fresh solvent, monomer, comonomer, hydrogen, and catalyst component feeds is possible. The combined solvent, monomer, comonomer and hydrogen feed is temperature controlled to anywhere between 5° C. to 50° C. and typically 40° C. by passing the feed stream through a heat exchanger. The fresh comonomer feed to the polymerization reactor is aligned to add comonomer to the recycle solvent. The total fresh feed to the polymerization reactor is injected into the reactor at two locations roughly with equal reactor volumes between each injection location. The fresh feed is controlled typically with each injector receiving half of the total fresh feed mass flow. The catalyst components are injected into the polymerization reactor through a specially designed injection inlet device and are combined into one mixed procatalyst/cocatalyst feed stream prior to injection into the reactor. The cocatalyst component is fed based on calculated specified molar ratios to the procatalyst component. Immediately following each fresh injection location (either feed or catalyst), the feed streams are mixed with the circulating polymerization reactor contents with Kenics static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by a screw pump. The effluent from the polymerization reactor (containing solvent, monomer, comonomer, hydrogen, catalyst components, and molten polymer) exits the reactor loop and enters a zone where it is contacted with a deactivating and acid scavenging agent (typically calcium stearate and the accompanying water of hydration) to stop the reaction and scavenge hydrogen chloride. In addition, various additives such as anti-oxidants can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve (responsible for maintaining the pressure of the reactor at a specified target). The stream then enters a two stage separation and devolatilization system where the polymer is removed from the solvent, hydrogen, and unreacted monomer and comonomer. Impurities are removed from the recycled stream before entering the reactor again. The separated and devolatilized polymer melt is pumped through a die specially designed for underwater pelletization, cut into uniform solid pellets, dried, and transferred into a hopper. After validation of initial polymer properties, the solid polymer pellets are transferred to storage devices.

The portions removed in the devolatilization step may be recycled or destroyed. For example, most of the solvent is recycled back to the reactor after passing through purification beds. The recycled solvent can still have unreacted co-monomer in it that is fortified with fresh co-monomer prior to re-entry to the reactor. The recycled solvent can still have some hydrogen which is then fortified with fresh hydrogen. Table 4 summarizes the polymerization conditions for PE Resin 1

TABLE 4

| Reactor Data | |
|---|---|
| REACTOR FEEDS | PE Resin 1 |
| Primary Reactor Feed Temperature (° C.) | 40 |
| Primary Reactor Total Solvent Flow (lb/hr) | 1,948 |
| Primary Reactor Fresh Ethylene Flow (lb/hr) | 375 |
| Primary Reactor Total Ethylene Flow (lb/hr) | 390 |
| Comonomer Type | 1-hexene |
| Primary Reactor Fresh Comonomer Flow (lb/hr) | 41 |
| Primary Reactor Total Comonomer Flow (lb/hr) | 210 |
| Primary Reactor Feed Solvent/Ethylene Ratio | 5.19 |
| Primary Reactor Fresh Hydrogen Flow (sccm) | 5096 |
| Primary Reactor Hydrogen mole % | 0.200 |
| REACTION CONDITIONS | |
| Primary Reactor Control Temperature (° C.) | 175 |
| Primary Reactor Pressure (Psig) | 725 |
| Primary Reactor FTnIR Outlet [C2] (g/L) | 8.1 |
| Primary Reactor log10 Viscosity (log(cP)) | 2.29 |
| Primary Reactor Polymer Concentration (wt. %) | 17.2 |
| Primary Reactor Exchanger's Heat Transfer Coefficient (BTU/(hr ft$^2$ ° F.)) | 33 |
| Primary Reactor Polymer Residence Time (hr) | 0.08 |
| Overall Ethylene conversion by vent (wt %) | 92.0 |
| CATALYST | |
| Primary Reactor Catalyst | Catalyst 1 |
| Primary Reactor Catalyst Flow (lb/hr) | 1.02 |
| Primary Reactor Catalyst Concentration (ppm) | 258 |
| Primary Reactor Catalyst Efficiency (M lbs Poly/lb Zr) | 1.52 |
| Primary Reactor Catalyst Metal Molecular Weight (g/mol) | 47.9 |
| Primary Reactor Co-Catalyst-1 Molar Ratio | 10.0 |
| Primary Reactor Co-Catalyst-1 Type | tri-ethyl-aluminum |

TABLE 4-continued

Reactor Data

| REACTOR FEEDS | PE Resin 1 |
|---|---|
| Primary Reactor Co-Catalyst-1 Flow (lb/hr) | 1.57 |
| Primary Reactor Co-Catalyst-1 Concentration (ppm) | 4,000 |

TABLE 5

PE Composition Resin Properties

| Type | PE Resin 1 | FLEXUS ™ 7200XP | EXCEED ™ 3518CB | LLDPE 1630 |
|---|---|---|---|---|
| Density (g/cc) | 0.917 | 0.919 | 0.918 | 0.918 |
| $I_2$, g/10 min | 2.97 | 3.52 | 3.5 | 3 |
| $I_{10}/I_2$ | 6.86 | 5.66 | 5.7 | 8.2 |
| Mn (g/mol) | 33,128 | 32,860 | 31,017 | 23,370 |
| Mw (g/mol) | 86,781 | 77,580 | 78,627 | 84,458 |
| Mz (g/mol) | 242,516 | 139,482 | 145,727 | 236,383 |
| Mw/Mn | 2.62 | 2.36 | 2.54 | 3.613 |
| CDBI (%) | 53.0 | 67.0 | 70.8 | 35.2 |
| Viscosity (Pa-s at 190° C.) 0.1 rad/s | 2,788 | 1,933 | 1,883 | 2,884 |
| Viscosity (Pa-s at 190° C.) 100 rad/s | 1,041 | 1,142 | 1,121 | 935 |
| (Viscosity 0.1 rad/s)/(Viscosity 100 rad/s) | 2.68 | 1.69 | 1.68 | 3.08 |
| Tan Delta 0.1 rad/s | 29 | 132 | 271 | 19.2 |

Neutron Activation Data*

| Type | Al, ppm | Mg, ppm | Ti, ppm | V, ppm | Hf, ppb | Zr, ppb | Cl, ppm |
|---|---|---|---|---|---|---|---|
| PE Resin 1 | 56 | 116 | 0.76 | 1.8 | ND @ 10 | 900 | 65 |
| FLEXUS ™ 7200XP | 13.4 | 1.8 | ND @ 0.3 | ND @ 0.002 | ND @ 10 | 450 | 0.68 |

*Niobium (Nb) (5 ppm), tantalum (Ta) (50 ppb), chromium (Cr) (0.5 ppm), molybdenum (Mo) (50 ppb), and tungsten (W) (5 ppm) were not detected in any of the examples at their respective detection limits, as indicated in the parentheses following each element.

Example 1

Three layer cast films were made using a Dolci 7-layer cast line having 5 extruders. The cling layer has a layer ratio of 12%, the core layer has a layer ratio of 76%, and the release layer has a layer ratio of 12%. The melt temperature of extrusion for extruder 1 is 251° C., extruder 2 is 197° C., extruder 3 is 253° C., extruder 4 is 235° C., extruder 5 is 181° C., and the die temperature is 235° C. The output rate is 1,000 kg/hr. The chill roll temperature is 17° C. The air gap is 5 ml. The film thickness is 25 microns. The film structures and film properties are further outlined in Table 6 below.

TABLE 6

Cast Film Structures

| Film description | Comparative film 1 | Inventive film 1 |
|---|---|---|
| Cling Layer (12%) | 82% DOWLEX ™ 2107B 18% Propylene Interpolymer | 87% DOWLEX ™ 2107B 13% Propylene Interpolymer |
| Core Layer (76%) | 100% FLEXUS ™ 7200XP | 100% PE Resin 1 |
| Release Layer (12%) | 100% Braskem LL-4801N | 100% Braskem LL-4801N |

TABLE 6-continued

Cast Film Structures

| Film description | Comparative film 1 | Inventive film 1 |
| --- | --- | --- |
| Film Thickness, microns | 25 | 25 |
| Avg Ultimate stretch, % | 350.3 | 356.8 |
| Stretch force @ 200%, lbs | 77.3 | 82.7 |
| Unwind force @ 200%, lbs | 4.61 | 4.42 |
| Sound level, dB | 79.5 | 79.6 |
| On-pallet tear @ 250% pre-stretch, lbs | 16.7 | 16.2 |
| On-pallet puncture, @ 250% pre-stretch, F2 force, lbs | 16.5 | 15.2 |
| Avg Cling @ 250% prestretch, grams | 15.7 | 20.3 |

As shown in Table 6, higher cling values are achieved even when reducing the amount of the cling agent from 18% for comparative film 1 to 13% for inventive film 1.

Example 2

Three layer cast films were made using a 5-layer cast line having 4 extruders. The cling layer has a layer ratio of 10%, the core layer has a layer ratio of 80%, and the release layer has a layer ratio of 10%. The melt temperature of the extruders ranges from 200° C.-250° C. The output rate is 860 kg/hr. The die temperature is 250° C. The air gap is 3 cm. Inventive film 2 was made using the following extruder pressures: 194/213/224/195 bar. Comparative film 2 was made using the following extruder pressures: 221/222/240/215 bar. The film thickness is 20 microns. The film structures and film properties are further outlined in Table 7 below.

TABLE 7

Cast Film Structures

| Film Description | Comparative film 2 | Inventive film 2 |
| --- | --- | --- |
| Cling Layer (10%) | 96% EXCEED ™ 3518CB<br>4% VISTAMAXX ™ 6102 | 96% PE Resin 1<br>4% VISTAMAXX ™ 6102 |
| Core Layer (12.5%) | 100% EXCEED ™ 3518CB | 100% PE Resin 1 |
| Core Layer (55%) | 100% LLDPE 1630 | 100% PE Resin 1 |
| Core Layer (12.5%) | 100% EXCEED ™ 3518CB | 100% PE Resin 1 |
| Release Layer (10%) | 100% ™ LL218A | 100% PE Resin 1 |
| Film Thickness, microns | 20 | 20 |
| Avg ultimate stretch, % | 425.9 | 414.7 |
| Stretch force @ 200%, lbs | 61.6 | 62.2 |
| Unwind force @ 200%, lbs | 10.5 | 10.4 |
| Sound level, dB | 82 | 81.6 |
| On-pallet tear @ 250% pre-stretch, lbs | 12.2 | 12.0 |
| On-pallet puncture @ 250% pre-stretch (F2 force), lbs | 11.2 | 11.0 |
| Avg Cling @ 250% pre-stretch, grams | 63.3 | 85.4 |

As shown in Table 1, higher cling values are achieved for inventive film 2, which uses the inventive polyethylene composition in the cling, core, and release layers, as compared to comparative film 2, which uses other LLDPE resins.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A multilayer cast film comprising a cling layer, a core layer, and a release layer, wherein:
   the cling layer comprises a propylene interpolymer comprising at least 60 wt. % units derived from propylene and between 1 and 40 wt. % units derived from ethylene, wherein the propylene interpolymer has a density of from 0.840 g/cm$^3$ to 0.900 g/cm$^3$, a highest DSC melting peak temperature of from 50.0° C. to 120.0° C., a melt flow rate, MFR2, of from 1 to 100 g/10 min when measured according to ASTM D1238 at 230° C. and 2.16 kg load, and a molecular weight distribution (MWD) of less than 4.0; and
   the core layer comprises a core layer polyethylene composition which comprises the reaction product of ethylene and, optionally, one or more alpha olefin comonomers, wherein the core layer polyethylene composition is characterized by the following properties:
   (a) a melt index, I2, of from 2.5 to 12.0 g/10 min;
   (b) a density of from 0.910 to 0.925 g/cc;
   (c) a melt flow ratio, I10/I2, of from 6.0 to 7.6; and
   (d) a molecular weight distribution, (Mw/Mn) of from 2.25 to 4.0.

2. The film of claim 1, wherein the propylene interpolymer has a percent crystallinity in the range of from 0.5% to 45%.

3. The film of claim 1, wherein the propylene interpolymer has a weight average molecular weight (Mw) of at least 50,000 grams per mole (g/mol).

4. The film of claim 1, wherein the cling layer further comprises a cling layer polyethylene composition which comprises the reaction product of ethylene and, optionally, one or more alpha olefin comonomers, wherein the cling layer polyethylene composition is characterized by one or more of the following properties:
   (a) a melt index, I2, of from 2.5 to 12.0 g/10 min;
   (b) a density of from 0.910 to 0.925 g/cc;
   (c) a melt flow ratio, I10/I2, of from 6.0 to 7.6; and
   (d) a molecular weight distribution, (Mw/Mn) of from 2.25 to 4.0.

5. The film of claim 1, wherein the release layer comprises a linear low density polyethylene or a release layer polyethylene composition which comprises the reaction product of ethylene and, optionally, one or more alpha olefin comonomers, wherein the release layer polyethylene composition is characterized by one or more of the following properties:
   (a) a melt index, I2, of from 2.5 to 12.0 g/10 min;
   (b) a density of from 0.910 to 0.925 g/cc;
   (c) a melt flow ratio, I10/I2, of from 6.0 to 7.6; and
   (d) a molecular weight distribution, (Mw/Mn) of from 2.25 to 4.0.

6. The film of claim 1, wherein the core layer polyethylene composition is formed in the presence of a catalyst composition comprising a multi-metallic procatalyst via solution polymerization.

7. The film of claim 1 wherein the core layer polyethylene composition has a CDBI of less than 60% or from 40% to 60%.

8. The film of claim 1, wherein the core layer polyethylene composition has a molecular weight distribution, (Mw/Mn) of from 2.6 to 3.5.

9. The film of claim 1, wherein the core layer polyethylene composition has a viscosity ratio (viscosity at 0.1 rad/s/viscosity at 100 rad/s, both measured at 190° C. using dynamic mechanical spectroscopy) of 2 to 6, or from 2.0 to 2.9.

10. A method of making a multilayer cast film, the method comprising:
    coextruding a cling layer composition, a core layer composition, and a release layer composition to form a multilayer cast film;
    wherein the cling layer composition comprises a propylene interpolymer comprising at least 60 wt. % units derived from propylene and between 1 and 40 wt. % units derived from ethylene, wherein the propylene interpolymer has a density of from 0.840 g/cm$^3$ to 0.900 g/cm$^3$, a highest DSC melting peak temperature of from 50.0° C. to 120.0° C., a melt flow rate, MFR2, of from 1 to 100 g/10 min when measured according to ASTM D1238 at 230° C. and 2.16 kg load, and a molecular weight distribution (MWD) of less than 4.0;
    wherein the core layer composition comprises a core layer polyethylene composition which comprises the reaction product of ethylene and, optionally, one or more alpha olefin comonomers, wherein the core layer polyethylene composition is characterized by the following properties:
    (a) a melt index, I2, of from 2.5 to 12.0 g/10 min;
    (b) a density of from 0.910 to 0.925 g/cc;
    (c) a melt flow ratio, I10/I2, of from 6.0 to 7.6; and
    (d) a molecular weight distribution, (Mw/Mn) of from 2.25 to 4.0; and
    wherein the release layer composition comprises a linear low density polyethylene or a release layer polyethylene composition which comprises the reaction product of ethylene and, optionally, one or more alpha olefin comonomers, wherein the release layer polyethylene composition is characterized by one or more of the following properties:
    (a) a melt index, I2, of from 2.5 to 12.0 g/10 min;
    (b) a density of from 0.910 to 0.925 g/cc;
    (c) a melt flow ratio, I10/I2, of from 6.0 to 7.6; and
    (d) a molecular weight distribution, (Mw/Mn) of from 2.25 to 4.0.

* * * * *